Figure 1:
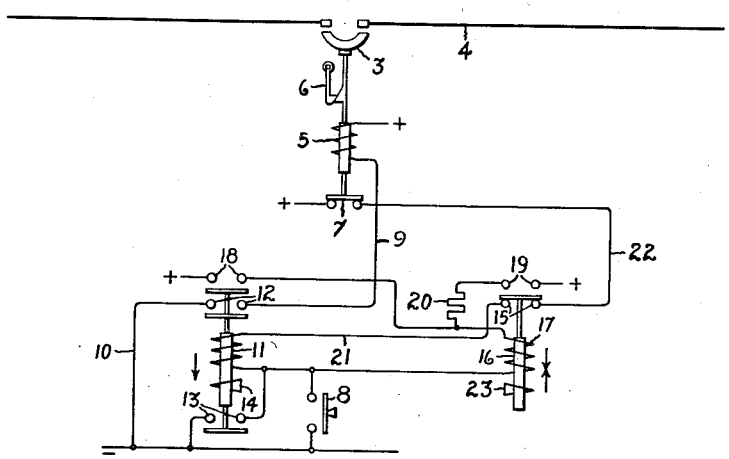

May 9, 1939.  H. BANY  2,157,810

CONTROL OF ELECTRIC SWITCHES

Filed Sept. 10, 1938

Inventor:
Herman Bany,
by Harry E. Dunham
His Attorney.

Patented May 9, 1939

2,157,810

UNITED STATES PATENT OFFICE 2,157,810

CONTROL OF ELECTRIC SWITCHES

Herman Bany, Lansdowne, Pa., assignor to General Electric Company, a corporation of New York Application September 10, 1938, Serial No. 229,332

8 Claims. (Cl. 175—294)

My invention relates to improvements in the control of electric switches and more particularly circuit breakers which are opened automatically on the occurrence of abnormal circuit conditions and which are arranged to be closed by suitable control switching means to effect the energization of electromagnetic operating means for closing the circuit breakers.

If the control switching means is maintained in the circuit closing position after the circuit breaker closes and the circuit breaker immediately opens, due to an abnormal condition on the circuit it controls or failure of the latching mechanism, the circuit breaker operating means is again energized as soon as the circuit breaker is open and consequently the circuit breaker is reclosed. Under such conditions, the circuit breaker may continue to open and close indefinitely. This so-called pumping action, if permitted, is practically certain to result in serious damage to the circuit breaker and other apparatus associated with the circuit which it controls.

In many circuit breaker control arrangements an anti-pumping feature, dependent on the circuit controlling position of the circuit breaker, is used. This has the disadvantage of requiring a nicety of adjustment in the circuit breaker mechanism so that there is a definite sequence in the operation of the moving contact of the circuit breaker and one or more auxiliary switches associated with the circuit breaker. It also has the further disadvantage that, in case the circuit breaker fails to close and latch, the closing coil may be destroyed by overheating because its circuit is not opened. This is particularly true in automatic stations where the closing control relay is often arranged to seal-in. This overheating feature may also be troublesome in manual operation if the operator does not realize quickly enough that the circuit breaker mechanism is defective.

An object of my invention is to prevent the repeated opening and closing of the circuit breaker under conditions such as those mentioned by an improved arrangement which eliminates the disadvantages set forth above.

In accordance with my invention, the circuit breaker electromagnetic closing means, after a closing operation, is rendered inoperative to reclose the circuit breaker as long as the control switching means is held in the circuit closing position by means operative independently of the circuit controlling position of the circuit breaker but dependent on the operation of the closing relay to effect the deenergization thereof and to prevent a subsequent reenergization until the control switching means is released from the circuit closing position.

My invention will be better understood from the following description when considered in connection with the accompanying drawing, and its scope will be pointed out in the appended claims.

Figure 2:
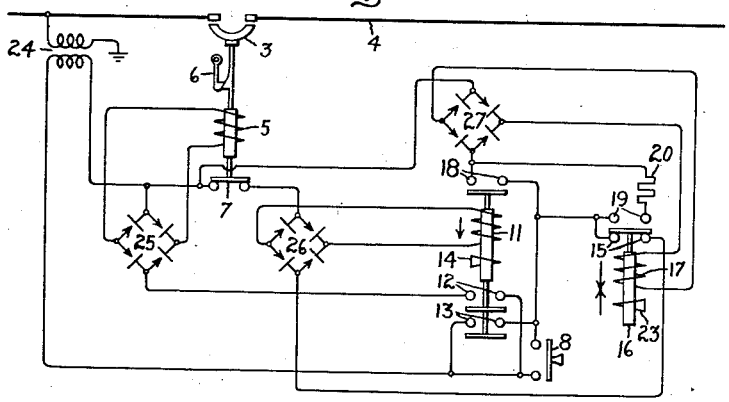

In the accompanying drawing, Fig. 1 illustrates diagrammatically a circuit breaker closing control arrangement embodying my invention and using a D. C. source for energizing the control circuits, and Fig. 2 illustrates diagrammatically a modification of my invention wherein the control circuit energization is obtained through suitable rectifying means from the alternating current line controlled by the circuit breaker.

The embodiment of my invention illustrated in Fig. 1 is shown as applied to a latch-closed circuit breaker 3 which controls the circuit of the line conductor 4. As shown, the circuit breaker is provided with electromagnetic closing means illustrated simply as a solenoid mechanism or closing coil 5 although any suitable motor mechanism may be used as will be obvious to those skilled in the art. For simplicity, I have illustrated the circuit breaker 3 as a single pole device without means for tripping the latch 6 or any showing of a trip-free mechanism although, as is well known to the art, the circuit breaker will usually embody both of these features. The circuit breaker may include a "b" auxiliary switch 7 which is closed when the circuit breaker is open and vice versa in order to prevent an unnecessary and undesirable energization of the closing coil 5 while the circuit breaker is closed, but this switch is not necessary so far as my invention is concerned.

For effecting the closing operation of the circuit breaker 3, there is provided a closing control comprising a closing control switch 8, a closing control relay 11, and a closing coil circuit comprising conductors 9 and 10, the closing coil 5 and the circuit closing contacts 12 of the relay 8. This is the general practice today instead of including the closing mechanism itself directly in the control circuit. The control relay contacts 12 are designed to carry the heavy D. C. current incidental to the closing operation. The control switch 8 may be either manually or automatically operated. In the former case, it may be provided with a seal-in feature, such as the control relay circuit-closing contacts 13, which bypass the control switch 8 whereby to insure energization of the closing control circuit long enough to latch the circuit breaker. As illustrated, the closing control relay 11 is of the so-called hesitating type with relatively quick pick-up and time drop-out. The latter feature may be obtained by a short-circuited winding 14. As shown, the energizing circuit of this relay includes the "b" switch 7 which opens the circuit of the relay so that no subsequent reenergization may occur while the circuit breaker remains closed. This feature although desirable is not necessary in accordance with my invention or critical as to definite sequence in the closing of the circuit breaker and the opening of the auxiliary switch 7.

In order to prevent reclosing the circuit breaker, as long as the control switch 8 is held closed, when the circuit breaker is closed on a fault, I provide in accordance with my invention improved means for preventing more than one circuit breaker closing operation for one closing operation of the control switch. As shown, this means comprises a switch 15 in series with the control switch 8 in the circuit of the winding of the closing control relay 11 and means for effecting an opening operation of the switch 15 when the control relay picks up and independently of the circuit controlling position of the circuit breaker. The means for controlling the switch 15 is illustrated as an auxiliary or lockout relay 16 whose single energizing winding 17 is arranged in series with the closing control switch 8 and circuit closing contacts 18 on the closing control relay 11 so as to be energized when this relay picks up. In order to maintain the auxiliary relay 16 energized once it is picked up so as to prevent a reclosing operation of the circuit breaker 3 while the closing control switch 8 is maintained closed, the relay 16 is provided with suitable holding means such as a seal-in control embodying the circuit closing contacts 19. A series resistance 20 may be included in the seal-in circuit of the winding 17 so that, with the maintaining type of closing control switch, the current may be limited both to reduce the battery drain and also to minimize heating of the relay so that its pick-up and consequent time delay in pick-up will be approximately the same under both hot and cold conditions. If the closing control switch is of the momentary type, the resistance 20 may be omitted and if of the maintaining type, the contacts 13 of the control relay 11 may be omitted.

Assuming the parts positioned as shown in Fig. 1, then the closure of the control switch 8 will complete the circuit of the winding of the control relay 11 from the minus side of the D. C. control source through the control switch 8, the winding of the control relay 11, the conductor 21, the switch 15 of the lockout relay 16, the conductor 22 and the circuit breaker auxiliary switch 7 to the plus side of the control source. The operation of the control relay to close its contacts 12 and 18 is thus effected. If the control switch 8 is of the momentary type generally used for this type of control, then the contacts 13 of the control relay will bypass the control switch 8 to maintain the control relay energized. The closing of the control relay contacts 12 completes the circuit of the closing coil 5 from the minus side of the D. C. control source through the conductor 10, the control relay contacts 12, the conductor 9 and the closing coil 5 to the plus side of the control source. This circuit is maintained long enough to insure latching of the circuit breaker mechanism on the basis that it is in proper working order. In order to insure the operation of the closing relay 11 before the opening of the switch 15, the lockout relay 16 is arranged to have a time delayed pick-up. For this purpose it may be provided with a short-circuited winding 23. With this arrangement it will also have some time delay in drop-out. At the expiration of the time delay of pick-up of the lockout relay 16, the switch 15 is opened to deenergize the circuit of the control relay 11 which drops out with a time delay sufficient to insure the circuit breaker latching operation. When the lockout relay 16 closes its contacts 19, it will remain energized as long as the closing control switch 8 or the bypass contact 13, if employed, remain closed. Consequently, even though the circuit breaker fails to close or remain closed, no repetition of the closing action can occur until the switches 8 and 13, if the latter is also used, are opened. If the control switch 8 is opened and the circuit breaker remains closed during the time drop-out periods of the relays 11 and 16, then the parts, with the exception of the circuit breaker mechanism, again position themselves as shown in Fig. 1.

The embodiment of my invention shown in Fig. 2 is essentially the same as that shown in Fig. 1 except that D. C. energization for the closing coil 5, control relay 11, and lockout relay 16 is obtained from the line 4, assuming that it is an A. C. circuit, through a potential transformer 24 and suitable rectifying means indicated as full wave rectifiers 25, 26 and 27 which may be of any suitable type. The operation of this embodiment of my invention will be obvious from the explanation of the operation of the embodiment of my invention shown in Fig. 1 since the parts function in the same manner and the rectifiers 25, 26 and 27 supply direct current to the closing coil 5, the control relay 11, and the lockout relay 16 respectively as will be obvious from the drawing.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a control system for effecting the closing operation of a circuit breaker provided with electromagnetic closing means, a closing control relay, means for controlling the energization of said control relay including a circuit and two serially related switches therein, a lockout relay effective when energized while one of said switches is closed to open the other of said switches and to maintain said other switch open as long as said one switch is maintained closed, and means for energizing said lockout relay in response to the closing operation of said control relay and independently of the circuit controlling position of the circuit breaker.

2. In a control system for effecting the closing operation of a circuit breaker provided with electromagnetic closing means, a quick pick-up time delay drop-out closing control relay comprising two sets of circuit closing contacts one set controlling the energization of said closing means, means for controlling the energization of said control relay including a circuit and two serially related switches therein, a time delay pick-up and seal-in lockout relay for controlling one of said switches, and an energizing circuit for said lockout relay including the other of said switches and the other set of circuit controlling contacts of the control relay.

3. In a control system for effecting the closing operation of a circuit breaker provided with electromagnetic closing means, a closing control relay, switching means actuated to the closed position by said control relay when energized, means for controlling the energization of said control relay including a circuit and two serially related switches therein, a lockout relay effective when energized while one of said switches is closed to open the other of said switches and to maintain said other switch open as long as said one switch is maintained closed, and an initial energizing circuit for said lockout relay including said one switch and the switching means actuated by said control relay.

4. In a control system for effecting the closing operation of a circuit breaker provided with electromagnetic closing means, a closing control relay comprising a set of circuit closing contacts, means for controlling the energization of said control relay including a circuit and two serially related switches therein, means for effecting the opening of one of said switches while the other switch is closed including a lockout relay having a single energizing winding, means for energizing said winding when the control relay closes its contacts while said other switch is closed to effect operation of the lockout relay, a circuit for said winding including the control relay contacts and said other switch in series, and means for maintaining the lockout relay in the operated position as long as said other switch is held closed.

5. In a control system for effecting the closing operation of a circuit breaker provided with electromagnetic closing means, a closing control relay comprising a set of circuit closing contacts, means for controlling the energization of said control relay including a circuit and two serially related switches therein, means for effecting the opening of one of said switches while the other switch is closed including a seal-in lockout relay, and means for energizing said lockout relay when the control relay closes its contacts while said other switch is closed.

6. In a control system for effecting the closing operation of a circuit breaker provided with electromagnetic closing means, a closing control relay, a switch for controlling the energization of said control relay, a lockout relay, means operated by the control relay upon energization thereof to effect energization of the lockout relay when said switch is closed, means independent of the circuit controlling position of the circuit breaker for subsequently maintaining the lockout relay energized as long as said switch remains closed, and means actuated by the lockout relay upon the energization thereof for deenergizing the control relay and maintaining it deenergized as long as said switch remains closed.

7. In a control system for a circuit breaker, a control relay, means responsive to the energization of said control relay for effecting the closing of the circuit breaker, an energizing circuit for said control relay including a normally open control switch, and means responsive to the closing of said control switch for opening said energizing circuit after a predetermined time interval and independently of the position of the circuit breaker and for maintaining said control relay deenergized as long as said control switch remains closed.

8. In a control system for a circuit breaker, a control relay, means responsive to the energization of said control relay for effecting the closing of the circuit breaker, an energizing circuit for said control relay including a normally open control switch, and means responsive to the energization of said control relay for opening said energizing circuit after a predetermined time interval and independently of the position of the circuit breaker and for maintaining said control relay deenergized as long as said control switch remains closed.

HERMAN BANY.